Patented Apr. 28, 1931

1,802,761

UNITED STATES PATENT OFFICE

WILLIS A. GIBBONS, OF GREAT NECK, NEW YORK, ASSIGNOR TO THE NAUGATUCK CHEMICAL COMPANY, OF NAUGATUCK, CONNECTICUT, A CORPORATION OF CONNECTICUT

PROCESS FOR TREATING RUBBER AND PRODUCTS OBTAINED THEREBY

No Drawing. Application filed December 9, 1926. Serial No. 153,737.

The present invention relates to improvements in the treatment of rubber and is concerned with the preparation of rubber from concentrated latices containing alkaline preservative which may be either volatile or non-volatile in whole or in part. The invention aims to provide a means for overcoming certain physical characteristics which are inherent in rubber prepared from such concentrated alkali preserved latex. The undesirable characteristics are in part comprehended by insufficient plasticity and cohesiveness on the mixing mill, calender, tubing machine, and other manufacturing apparatus, by a lower tensile strength, slower rate of drying and frequently reduced abrasion resistance. These disadvantages are more pronounced in the case of rubber prepared from concentrated latex containing fixed alkali or non-volatile alkaline preservatives, stabilizers, etc. than in the case of rubber prepared from concentrated latex containing volatile preservative, such as ammonia.

With a particular embodiment in mind, but without intent to place undue limitations upon the scope of the invention beyond what may be required by the prior art, the invention briefly described consists in treating alkaline preserved concentrated latex with an acidic material to increase the hydrogen ion concentration of the latex to a point approximating neutrality, and preferably somewhat on the acid side of neutrality and completing the manufacture of the latex into rubber or rubber articles. The invention includes the acid treatment of such concentrated latex to which compounding ingredients have been added. By the broad term "compounding ingredients" is meant any of the ingredients customarily added to rubber in its commercial preparation. The invention further includes carrying out the acid treatment at any desired stage of preparation subsequent to concentration of the latex and prior to the recovery of dry rubber. In other words the process of the invention, hereinafter termed the acid treatment of the concentrated latex, is directed towards the treatment of concentrated latex containing an alkaline preservative, either volatile or non-volatile, and with or without compounding ingredients, while said concentrated latex contains water. The invention further includes under the acidic materials free acids, buffer materials of a suitable hydrogen ion concentration and salts which hydrolize to give an acid reaction.

As one illustration of the invention the following is given: 100 parts by weight of rubber in the form of ammonia preserved concentrated latex containing 60% of total solids (preserved with 1% of ammonia) are added to 22 parts by weight of uncompressed carbon black and 30 parts by weight of clay. The carbon black and clay are placed in a closed mixer and the concentrated latex added while the mixer is in operation. During the mixing operation the greater part of the ammonia will be volatilized since the contents of the mixer become heated during the mixing operation. After the ammonia has almost entirely disappeared, 1.25 parts by weight of phosphoric acid are introduced into the mixer and the mixing continued until the acid is distributed. The contents of the mixer are now removed and the water dried off in any suitable manner in a dryer or on a heated mixing mill. Even before the batch is entirely dry, it may be observed that when placed on a mixing mill it becomes coherent in a very short time, say in three or four minutes and is completely plasticized, soft, and in general entirely like an ordinary pale crepe batch containing the same ingredients. Using a laboratory mixing mill at a roll temperature of around 190° F. for instance the complete breakdown of the above stock will take place in 7 to 8 minutes, and the batch may be calendered directly after the customary warming up, to give a smooth continuous sheet free from any lumps. Under the same breakdown conditions, a similar batch containing no phosphoric acid, does not become smooth in 18 min. and does not calender after a much longer milling treatment. It is of course understood that suitable vulcanizing ingredients may be introduced into the above mixture either before or after the batch has reached dryness and has been plasticized on the mixing mill depending upon the nature of the said ingredients. The latter practice is desirable where the vulcanizing ingredients include organic accelerators of the type which are known to cause prevulcanization. Where such high powered ingredients are not present, it is of course permissible to introduce the vulcanizing ingredients at any desired time.

As an illustration of the invention in which a non-volatile alkaline preservative is contained in the concentrated latex, a similar composition to that in the previous example may be prepared. In this instance, the latex may be of the same concentration as in the previous example or higher, say up to 80%. For the purpose of this example, the preservative for this concentrated latex is 1% of potassium hydroxide, this being a good example of a non-volatile alkaline preservative. The procedure is otherwise similar to that given in the previous example. This composition when placed upon a laboratory mixing mill as above described will show a complete breakdown in about 8 minutes, and the mix will calender smoothly. If the acid treatment be omitted, the same stock will not break down in 20 min. at 190° F., and will not calender smoothly at all, regardless of whether it be milled for an hour or more. A stock similar to the above, but without the acid treatment will give a tensile strength fully 25% less than a similar stock which has undergone the acid treatment. The latter treatment also improves other physical properties of the rubber over what can be obtained from a stock of the same type which has not been so treated.

To illustrate the invention as applied to uncompounded concentrated latices, preserved with a volatile alkaline substance or with a fixed alkaline preservative, stabilizer, etc., a quantity of the concentrated latex may be dehydrated in any suitable manner in a heated closed mixer or in a suitable dryer or on a mixing mill or in any other way. The acid treatment may be applied at any desired stage of the drying, but for the sake of convenience of distribution, it is often preferable to introduce the acid while there is still an appreciable amount of water in the latex. This applies particularly to the salts which hydrolize to give an acid reaction. It is of course understood that the acid materials may be added in the form of solutions of any convenient concentration in which case they may be added at any time. The amount of acidic material to be added is that required to neutralize the amount of alkaline preservative, either fixed or volatile and preferably to impart a slight acidic reaction. This may be expressed in terms of hydrogen ion concentration as imparting a reaction which is approximately neutral or slightly on the acid side of neutrality. The neutrality point may be simply expressed as pH7. The alkali preserved concentrated latex has a pH greater than 7 whereas the acid treated latex has a pH less than 7. To illustrate this a potassium hydroxide preserved concentrated latex showed after treatment with 1¼% of phosphoric acid a pH of 6.5, indicating a slight acidity. It is of course understood that where it is not desirous to have a distinct acid reaction, and where it is not essential to have a rubber which breaks down as smoothly as an acid rubber, it will be within the scope of the invention to bring the pH down near neutrality (pH7) but still on the basic side. Such a rubber will show intermediate properties of plasticity, tensile strength, etc.

While phosphoric acid has been given in the above example as the acidic material, the same results may be obtained with acetic acid, with primary sodium phosphate, zinc acetate, or other acids or salts which hydrolize to give an acid reaction. In employing these other acidic materials the amount to be chosen is that required to neutralize the amount of fixed or volatile preservative in the concentrated latex. As stated above the acidic material may be added in solution if desired and if this is more convenient.

While in many cases it is desirable to use a closed mixer, especially in instances where compounding ingredients are to be added to the concentrated latex prior to complete drying, the same results may also be obtained if the entire operation, including the addition of the compounding ingredients (where these are to be introduced) and of the acid material, be carried out on a mixing mill. There is often considerable convenience in carrying out the entire compounding, acid treatment, drying, and milling upon the same piece of apparatus.

While ammonia has been used as the illustration of a volatile alkaline preservative, and potassium hydroxide as typifying the non-volatile or fixed alkaline preservative, stabilizer, etc., the invention applies equally well to the other known alkaline or basic preservatives, stabilizers, etc.

As stated in connection with the first example, breakdown figures have been given as based on a laboratory mixing mill, the roll temperature of which was maintained at 190° F. The values expressed throughout the application are comparative, but the values would not of course be the same for factory sized mixing mills. However, the improvement in breakdown imparted by the acid treatment is approximately of the same order of magnitude on factory sized mills as on the laboratory sized mills.

Having thus described my invention what I claim and desire to protect by Letters Patent is:

1. A method of improving properties of rubber derived from concentrated latex preserved with an alkali which comprises mixing an acidic material with said concentrated latex, and evaporating water and recovering a rubber of a reduced alkalinity containing non-rubber solids of the latex.

2. A method of improving properties of rubber derived from concentrated latex preserved with an alkali which comprises mixing an acidic material with said alkaline concentrated latex in amounts calculated to bring the pH of the latex at least to approximate neutrality, and evaporating water and recovering a rubber containing non-rubber solids of the latex and having a reaction in the neighborhood of pH7.

3. A method of improving properties of rubber derived from concentrated latex preserved with non-volatile alkali which comprises mixing an acidic material with said latex in an amount sufficient to bring the pH of the latex below 7, and evaporating water from the entire mixture in bulk and recovering a rubber having improved plastic properties.

4. A method of preparing a rubber composition which comprises concentrating natural latex to obtain a latex composition containing over fifty per cent. solids and preserved with a non-volatile alkali, adding an acidic material thereto substantially to neutralize the alkali, without substantially coagulating the rubber content of the latex, and evaporating the water from the latex and recovering substantially all of the solids contained in the latex.

5. A method of preparing a rubber composition which comprises concentrating natural latex to obtain a latex composition containing over fifty per cent. solids and preserved with a non-volatile alkali, adding phosphoric acid thereto substantially to neutralize the alkali, without substantially coagulating the rubber content of the latex, and evaporating the water from the latex and recovering substantially all of the solids contained in the latex.

6. A method of improving the properties of rubber, which comprises evaporating a body of concentrated latex, preserved with alkali, to substantial dryness while retaining the solids of the latex, and during the evaporating operation and prior to its completion reducing the pH of the latex to not over approximately 7 by mixing with it a material which hydrolizes to give an acid reaction.

7. A method of improving the properties of rubber, which comprises mixing a concentrated latex, preserved with alkali, with compounding ingredients and evaporating to substantial dryness, and during said operations and prior to their completion reducing the pH of the mixture to not over approximately 7 by mixing with it a material which hydrolizes to give an acid reaction.

Signed at New York, county of New York, State of New York, this 8th day of December, 1926.

WILLIS A. GIBBONS.